US012424785B2

(12) United States Patent
Henry et al.

(10) Patent No.: US 12,424,785 B2
(45) Date of Patent: Sep. 23, 2025

(54) RECEPTACLE CONNECTOR

(71) Applicant: TE Connectivity Solutions GmbH, Schaffhausen (CH)

(72) Inventors: Randall Robert Henry, Lebanon, PA (US); Brandon Michael Matthews, McAlisterville, PA (US); Brian Patrick Costello, Athens, GA (US); Sandeep Patel, Littleton, CO (US); Christopher William Blackburn, Bothell, WA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 320 days.

(21) Appl. No.: 18/316,520

(22) Filed: May 12, 2023

(65) Prior Publication Data

US 2024/0380153 A1 Nov. 14, 2024

(51) Int. Cl.
*H01R 13/502* (2006.01)
*H01R 12/73* (2011.01)

(52) U.S. Cl.
CPC ......... *H01R 13/502* (2013.01); *H01R 12/737* (2013.01)

(58) Field of Classification Search
CPC .... H01R 13/502; H01R 12/737; H01R 12/62; H01R 12/73; H01R 12/81; H01R 12/87; H01R 12/91; H01R 12/716; H01R 13/46; H01R 13/66
See application file for complete search history.

(56) References Cited

U.S. PATENT DOCUMENTS

| | | | | |
|---|---|---|---|---|
| 4,969,824 A * | 11/1990 | Casciotti | H01R 12/62 | 439/62 |
| 6,722,915 B1 * | 4/2004 | McAlonis | H01R 12/721 | 439/493 |
| 2018/0040972 A1* | 2/2018 | Phillips | H01R 13/2442 | |
| 2021/0313748 A1* | 10/2021 | Henry | H01R 13/642 | |
| 2022/0190513 A1* | 6/2022 | Henry | H01R 13/6582 | |
| 2024/0250460 A1* | 7/2024 | Henry | H01R 12/89 | |
| 2024/0250480 A1* | 7/2024 | Henry | H01R 13/6594 | |
| 2024/0380153 A1* | 11/2024 | Henry | H01R 13/502 | |

* cited by examiner

*Primary Examiner* — Abdullah A Riyami
*Assistant Examiner* — Nader J Alhawamdeh

(57) ABSTRACT

A receptacle connector includes a receptacle housing having a mounting base at a rear configured to be mounted to a host circuit board. The receptacle connector includes a housing insert received in the receptacle housing. The housing insert includes a slot that receives a pluggable module. A flexible circuit is received in the receptacle housing and has a mating end in the housing insert for mating engagement with the pluggable module and a terminating end extending from the receptacle housing for termination to the host circuit board. A flexible circuit support is used to support the flexible circuit in the receptacle housing with support elements engage the flexible circuit to press the circuit conductors into mating engagement with the contacts of the pluggable module.

20 Claims, 9 Drawing Sheets

RECEPTACLE CONNECTOR

BACKGROUND OF THE INVENTION

The subject matter herein relates generally to electrical connectors.

Some communication systems utilize communication connectors, such as receptacle connectors to interconnect various components of the system for data communication. Some known communication systems use pluggable modules, such as I/O modules or circuit cards, which are electrically connected to the receptacle connectors. The pluggable modules may have module circuit boards or contact arrays that are plugged into the receptacle connectors during the mating operation. The receptacle connectors may be card edge connectors having an upper row of contacts and a lower row of contact for mating with a corresponding circuit board.

Known connectors are not without disadvantages. For instance, the contacts of the connectors are arranged in a row and held in the housing of the receptacle connector. At high speeds, the receptacle connector are susceptible to performance degradation, such as due to cross talk between the contacts. Additionally, the contacts are exposed to multiple discontinuities along the lengths of the contacts due to changes in interfaces with the housing and changes in geometries of the contacts. The discontinuities lead to signal degradation.

A need remains for a reliable receptacle connector.

BRIEF DESCRIPTION OF THE INVENTION

In one embodiment, a receptacle connector is provided and includes a receptacle housing that has a front cavity and a rear cavity. The receptacle housing has a mounting base at the rear configured to be mounted to a host circuit board. The receptacle connector includes a housing insert received in the front cavity. The housing insert includes a slot configured to receive a mating end of a pluggable module. The receptacle connector includes a flexible circuit received in the rear cavity. The flexible circuit has a mating end received in the housing insert and extending along the slot for mating engagement with the pluggable module. The flexible circuit includes circuit conductors at the mating end for mating engagement with contacts at the mating end of the pluggable module. The flexible circuit includes a terminating end extending from the receptacle housing for termination to the host circuit board. The receptacle connector includes a flexible circuit support to support the flexible circuit in the receptacle housing. The flexible circuit support includes a carrier received in the rear cavity and support elements extending from the carrier into the housing insert. The support elements engage the flexible circuit to press the circuit conductors into mating engagement with the contacts of the pluggable module.

In another embodiment, a receptacle connector is provided and includes a receptacle housing that has a front cavity and a rear cavity. The receptacle housing has a mounting base at the rear configured to be mounted to a host circuit board. The receptacle connector includes a housing insert received in the front cavity. The housing insert includes a slot configured to receive a mating end of a pluggable module. The receptacle connector includes a biasing member coupled between the receptacle housing and the housing insert. The housing insert is movable within the front cavity between an extended position and a retracted position. The biasing member forward biasing the housing insert relative to the receptacle housing in the extended position. The biasing member is compressed when the housing insert is moved from the extended position to the retracted position. The receptacle connector includes a flexible circuit received in the rear cavity. The flexible circuit has a mating end received in the housing insert and extends along the slot for mating engagement with the pluggable module. The flexible circuit includes circuit conductors at the mating end for mating engagement with contacts at the mating end of the pluggable module. The flexible circuit includes a terminating end extending from the receptacle housing for termination to the host circuit board. The receptacle connector includes a flexible circuit support to support the flexible circuit in the receptacle housing. The flexible circuit support includes a carrier received in the rear cavity and support elements extending from the carrier into the housing insert. The housing insert moves the support elements inward toward the flexible circuit as the housing insert is moved from the extended position to the retracted position to press the circuit conductors into mating engagement with the contacts of the pluggable module.

In a further embodiment, a receptacle connector is provided and includes a receptacle housing that has a front cavity and a rear cavity. The receptacle housing has a mounting base at the rear configured to be mounted to a host circuit board. The receptacle connector includes a housing insert received in the front cavity. The housing insert includes a slot configured to receive a mating end of a pluggable module. The housing insert includes a flexible circuit pocket outward of the slot and a support element pocket outward of the flexible circuit pocket. The receptacle connector includes a flexible circuit received in the rear cavity. The flexible circuit has a mating end received in the flexible circuit pocket of the housing insert. The flexible circuit includes circuit conductors at the mating end for mating engagement with contacts at the mating end of the pluggable module. The flexible circuit includes a terminating end extending from the receptacle housing for termination to the host circuit board. The receptacle connector includes a flexible circuit support to support the flexible circuit in the receptacle housing. The flexible circuit support includes a carrier received in the rear cavity and support elements extending from the carrier into the support element pocket of the housing insert. The support elements engage the flexible circuit to press the circuit conductors into mating engagement with the contacts of the pluggable module.

DETAILED DESCRIPTION OF THE INVENTION

Figure 1:
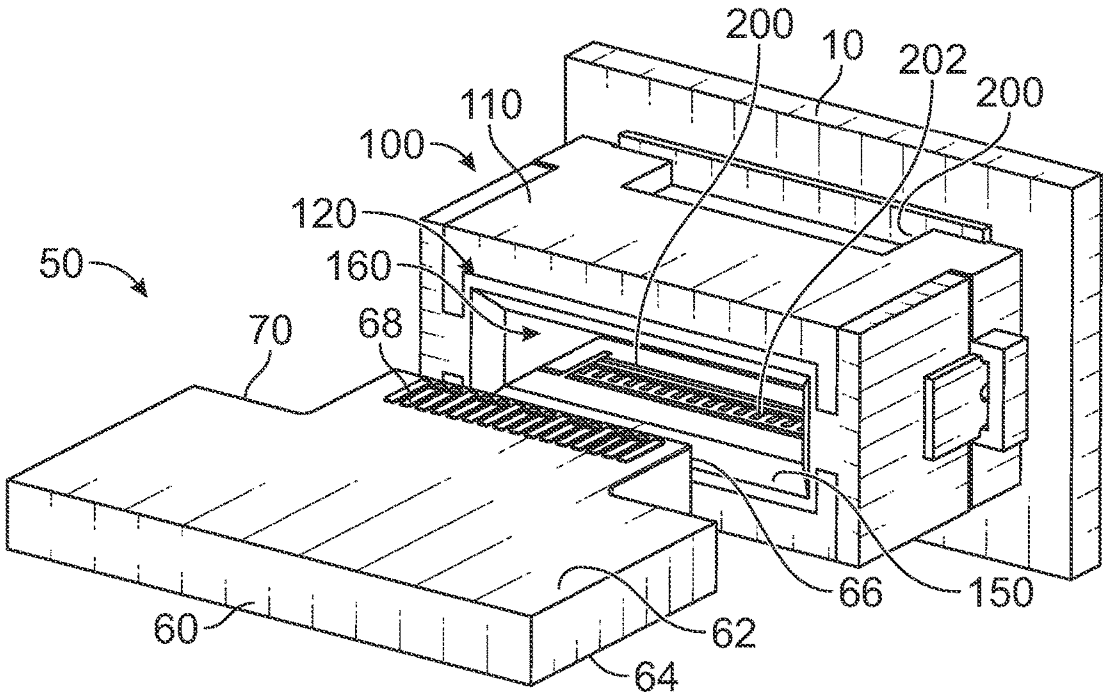
FIG. 1 is a front perspective view of a receptacle connector in accordance with an exemplary embodiment.
Figure 2:
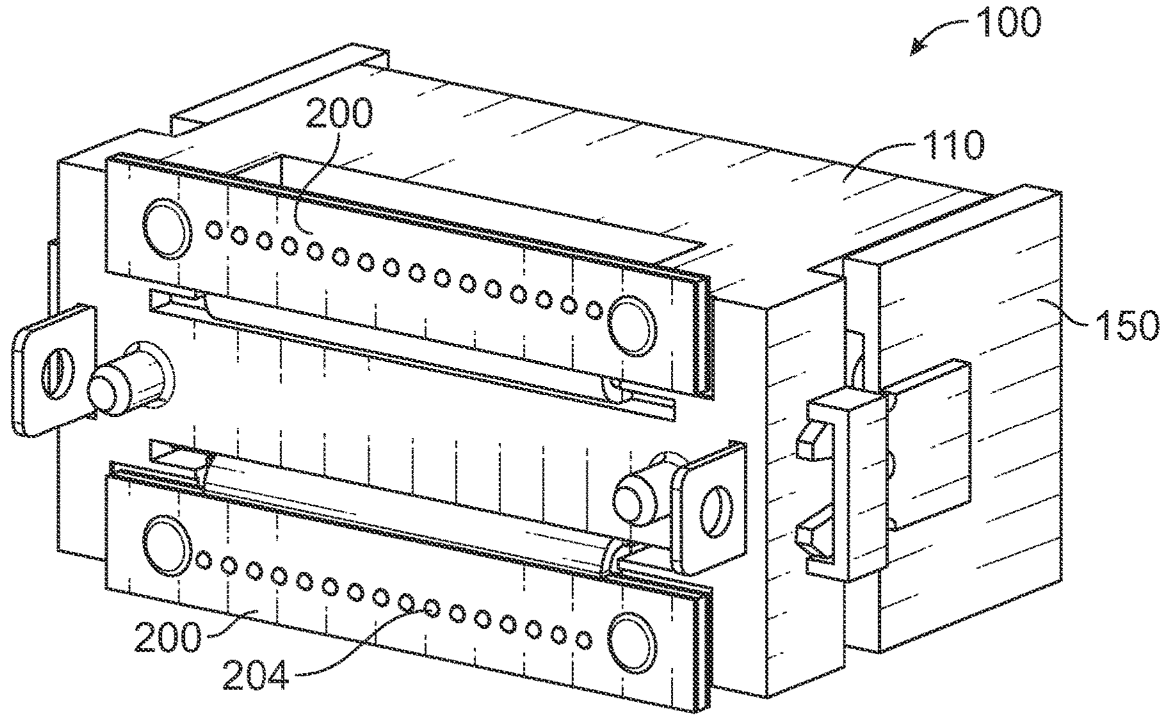
FIG. 2 is a rear perspective view of the receptacle connector in accordance with an exemplary embodiment.

FIG. 1 is a front perspective view of a receptacle connector 100 in accordance with an exemplary embodiment. FIG. 2 is a rear perspective view of the receptacle connector 100 in accordance with an exemplary embodiment. The receptacle connector 100 is configured to be mounted to a host circuit board 10 (FIG. 1). The receptacle connector 100 is configured to be mated with a pluggable module 50 (FIG. 1) to electrically connect the pluggable module 50 with the host circuit board 10. In an exemplary embodiment, the receptacle connector 100 is a card edge connector. However, the receptacle connector 100 may be another type of electrical connector in alternative embodiments, such as a socket connector. In other alternative embodiments, the receptacle connector 100 may be terminated to wires or cables rather than the host circuit board 10.

In an exemplary embodiment, the pluggable module 50 includes a pluggable module 50 configured to be plugged into a slot 160 of the receptacle connector 100. Optionally, the pluggable module 50 may include a plug housing surrounding and holding the pluggable module 50. For example, the pluggable module 50 may be an input/output (I/O) connector, such as a transceiver module. The pluggable module 50 may include one or more cables or wires electrically connected to the pluggable module 50. The pluggable module 50 may include one or more electrical components, such as a chip, a memory module, a processor, an optical/digital converter, or other type of electrical component mounted to the pluggable module 50. Other types of pluggable modules may be used in alternative embodiments, such as pluggable modules that do not include a circuit card. For example, the pluggable module 50 may include a flex circuit rather than a rigid circuit card. The pluggable module 50 may include an array of contacts, such as flat stamped contact pads rather than a circuit card.

The circuit card 60 includes an upper surface 62 and a lower surface 64. The circuit card 60 includes a card edge 66 at the mating end of the circuit card 60 is configured to be plugged into the slot 160 of the receptacle connector 100. The pluggable module 50 includes contacts 68 configured to be electrically connected to the receptacle connector 100 when plugged into the slot 160 of the receptacle connector 100. For example, the contacts 68 may be circuit pads at the card edge 66 of the circuit card 60 configured to be electrically connected to the receptacle connector 100 when plugged into the slot 160 of the receptacle connector 100. The contacts 68 may be provided on the upper surface 62 and/or the lower surface 64. The contacts 68 of the pluggable module 50 may be other types of contacts in alternative embodiments. For example, the contacts 68 may be an array of stamped and formed contacts held by a carrier or housing of the pluggable module 50. The contacts 68 may be circuit traces of a flexible circuit in alternative embodiments.

In the illustrated embodiment, the circuit card 60 includes shoulders 70 and one or both sides of the card edge 66. The shoulders 70 may bottom out against the receptacle connector 100 when the circuit card 60 is plugged into the slot 160 of the receptacle connector 100.

The receptacle connector 100 includes a receptacle housing 110 that receives a housing insert 150 and one or more flexible circuits 200. The housing insert 150 is received in a front cavity 120 of the receptacle housing 110. The housing insert 150 is used to position the flexible circuit 200 within the receptacle housing 110 for mating with the pluggable module 50. In an exemplary embodiment, the housing insert 150 includes the slot 160 that receives the pluggable module 50. The housing insert 150 guides the pluggable module 50 into mating engagement with the flexible circuit 200 as the card edge 66 of the pluggable module 50 is loaded into the slot 160. The flexible circuits 200 are configured to be electrically connected to the contacts 68 of the pluggable module 50 when the card edge 66 is plugged into the slot 160 of the receptacle connector 100. For example, the flexible circuits 200 include circuit conductors 202 configured to be electrically connected to the contacts 68. The circuit conductors 202 may include traces, pads, vias, and the like routed along one or more layers of the flexible circuits 200. The flexible circuits 200 are configured to be terminated to the host circuit board 10. In the illustrated embodiment, a ball grid array (BGA) of solder balls 204 are electrically connected to the corresponding circuit conductors 202 and positioned for termination to the host circuit board 10.

Figure 3:
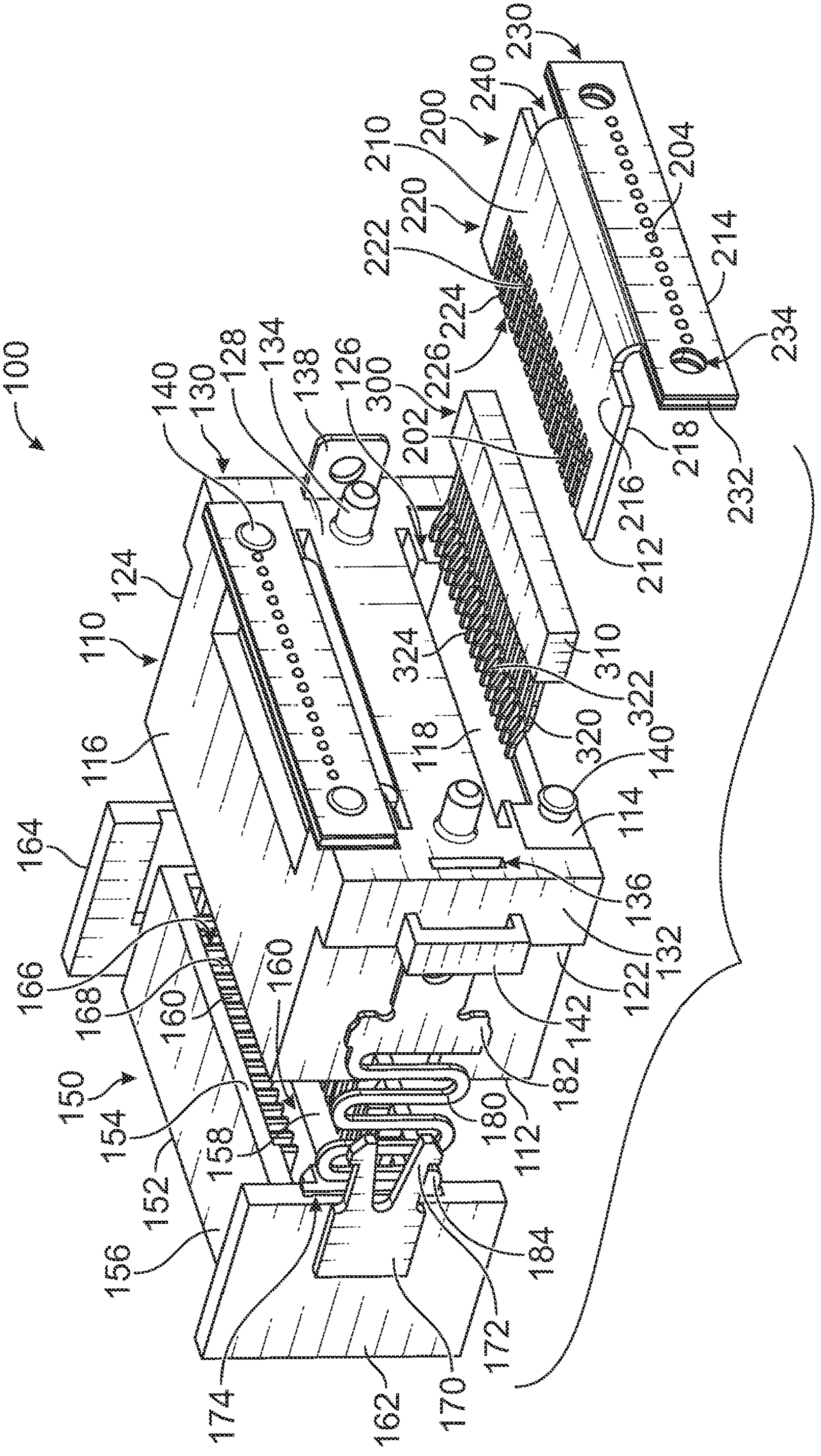
FIG. 3 is an exploded view of the receptacle connector in accordance with an exemplary embodiment.

FIG. 3 is an exploded view of the receptacle connector 100 in accordance with an exemplary embodiment. FIG. 3 shows the receptacle housing 110, the housing insert 150 and a pair of the flexible circuits 200. In an exemplary embodiment, the receptacle connector 100 includes flexible circuit supports 300 for supporting the flexible circuits 200. In an exemplary embodiment, the receptacle connector 100 includes biasing members 180 between the receptacle housing 110 and the housing insert 150. The biasing members 180 are used to control movement between the housing insert 150 and the receptacle housing 110, such as during mating with the pluggable module 50.

The receptacle housing 110 is manufactured from a dielectric material, such as a plastic material. The receptacle housing 110 may be a molded part. The receptacle housing 110 extends between a front 112 and a rear 114. The receptacle housing 110 includes an upper wall 116 and a lower wall 118 that extend between the front 112 and the rear 114. The receptacle housing 110 includes the front cavity 120 (FIG. 1) at the front 112. The front cavity 120 is located between the upper wall 116 and the lower wall 118. The front cavity 120 is located between a first side wall 122 and a second side wall 124. The receptacle housing 110 includes a rear cavity 126 at the rear 114. The rear cavity 126 receives the flexible circuit supports 300 and the flexible circuits 200. In the illustrated embodiment, the receptacle housing 110 includes a base wall 128 at the rear 114 that divides the rear cavity 126 into multiple cavities, such as an upper rear cavity and a lower rear cavity that receive the corresponding upper and lower flexible circuit supports 300 and the upper and lower flexible circuits 200.

The receptacle housing 110 includes a mounting base 130 at the rear 114 configured to be mounted to the host circuit board 10. The mounting base 130 includes mounting blocks 132 at the first and second sides of the receptacle housing 110. The mounting base 130 includes locating pins 134 extending from the rear 114, such as from the base wall 128. The locating pins 134 are configured be received in openings in the host circuit board 10 to locate the receptacle connector 100 relative to the host circuit board 10, such as to locate the receptacle connector 100 relative to board contacts on the host circuit board 10. Optionally, the locating pins 134 may be keyed (for example, sized and/or shaped) for keyed connection of the receptacle connector 100 to the host circuit board 10.

In an exemplary embodiment, the mounting blocks 132 include openings 136 therethrough. The openings 136 are configured to receive solder tabs 138. The solder tabs 138 are configured to be soldered to the host circuit board 10 to mechanically secure the receptacle connector 100 to the host circuit board 10. The solder tabs 138 provide strain relief for the solder balls 204. Other types of securing features may be used in alternative embodiments, such as threaded fasteners, clips, latches or other types of securing features.

In an exemplary embodiment, the receptacle housing 110 includes connecting posts 140 at the rear 114 for mechanically connecting the flexible circuits 200 to the receptacle housing 110. The connecting posts 140 are used to locate the flexible circuits 200 relative to the receptacle housing 110 (for example, side to side and/or top to bottom). The connecting posts 140 are used to secure the flexible circuits 200 to the receptacle housing 110. For example, the connecting posts 140 may be heat staked to the flexible circuits 200 to secure the flexible circuits 200 relative to the receptacle housing 110. Other types of locating and/or securing features may be used in alternative embodiments to connect the flexible circuits 200 to the receptacle housing 110.

In an exemplary embodiment, the receptacle housing 110 includes securing elements 142 for securing the housing insert 150 to the receptacle housing 110. In the illustrated embodiment, the securing elements 142 include brackets at the sides of the receptacle housing 110 configured to receive a latch of the housing insert 150 to secure the housing insert 150 to the receptacle housing 110. The brackets form non-permanent or separable connections between the housing insert 150 in the receptacle housing 110 allowing removal of the housing insert 150, such as for repair or replacement of components of the receptacle connector 100. Other types of securing elements may be used in alternative embodiments, such as threaded fasteners, clips, deflectable latches, and the like. The securing elements 142 may be provided at other locations in alternative embodiments, such as the top and/or the bottom.

The housing insert 150 is manufactured from a dielectric material, such as a plastic material. The housing insert 150 may be a molded part. Optionally, the housing insert 150 may be manufactured from a different material than the receptacle housing 110. The housing insert 150 extends between a front 152 and a rear 154. The housing insert 150 includes an upper wall 156 and a lower wall 158 that extend between the front 152 and the rear 154. The housing insert 150 includes the slot 160 between the upper wall 156 and the lower wall 158. The slot 160 is located between a first side wall 162 and a second side wall 164.

The housing insert 150 includes pockets 166 at the rear 154 that receive portions of the flexible circuit supports 300. For example, the housing insert 150 may include an upper pocket 166 in the upper wall 156 and a lower pocket 166 in the lower wall 158. The pockets 166 may receive portions of the corresponding flexible circuits 200. Optionally, each pocket 166 may include a plurality of divider walls 168 that separate the pocket 166 into individual chambers that receive corresponding portions of the flexible circuit support 300.

In an exemplary embodiment, the housing insert 150 includes mounting tabs 170 at the first side wall 162 and the second side wall 164. The mounting tabs 170 are used to mount the housing insert 150 to the receptacle housing 110. In an exemplary embodiment, the mounting tabs 170 include latches 172 that are coupled to the securing elements 142 of the receptacle housing 110. For example, the latches 172 may be received in the brackets and latchably coupled thereto. The latches 172 are releasable to allow removal of the housing insert 150 from the receptacle housing 110, such as for repair or replacement of components of the receptacle connector 100.

In an exemplary embodiment, the housing insert 150 includes biasing member pockets 174 at the first side wall 162 and the second side wall 164. The biasing member pockets 174 receive the biasing members 180. In the illustrated embodiment, the biasing member pockets 174 extend along interior portions of the first and second side walls 162, 164. Other locations are possible in alternative embodiments, such as at the upper wall 156 and/or the lower wall 158.

During assembly, the biasing members 180 are coupled between the receptacle housing 110 and the housing insert 150. For example, each biasing member 180 extends between a first end 182 and a second end 184. The first end 182 is coupled to the receptacle housing 110 and the second end 184 is coupled to the housing insert 150. In an exemplary embodiment, the biasing members 180 are spring elements, such as waves springs, leaf springs, coil springs, and the like. The biasing members 180 are compressible and exert and outward biasing force on the housing insert 150. For example, during assembly, when the housing insert 150 is loaded into the front cavity 120 of the receptacle housing 110, the biasing members 180 are compressed. The biasing members 180 exert a forward biasing force on the housing insert 150 relative to the receptacle housing 110. For example, the biasing members 180 force the housing insert 150 to move in a forward direction relative to the receptacle housing 110. The latches 172 are latchably coupled to the securing elements 142 to prevent spring off or removal of the housing insert 150 from the receptacle housing 110. The forward biasing force may be overcome to allow movement of the housing insert 150 relative to the receptacle housing 110. For example, the housing insert 150 may be pushed rearward, such as to further load the housing insert 150 into the front cavity 120 of the receptacle housing 110. The movement of the housing insert 150 is movement relative to the flexible circuit supports 300 and the flexible circuits 200. In an exemplary embodiment, the movement of the housing insert 150 relative to the flexible circuit supports 300 causes loading of the flexible circuit supports 300 against the flexible circuits 200 to cause mating engagement of the flexible circuits 200 to the pluggable module 50.

In an exemplary embodiment, the receptacle connector 100 includes a pair of the flexible circuit supports 300, such as an upper flexible circuit support and a lower flexible circuit support. Each flexible circuit support 300 is received in the rear cavity 126 and is used to support the flexible circuit 200 in the receptacle housing 110. In the illustrated embodiment, the flexible circuit support 300 is configured to be rear loaded into the rear cavity 126. However, in alternative embodiments, the flexible circuit supports 300 may be front loaded into the receptacle housing 110 or may be loaded through the top or the bottom. In an exemplary embodiment, the flexible circuit support 300 is an overmolded lead frame. For example, the flexible circuit support 300 includes a lead frame and an overmold body overmolded around a portion of the lead frame. Other types of support structures may be used in alternative embodiments.

In an exemplary embodiment, the flexible circuit support 300 includes a carrier 310 and a plurality of support elements 320. The support elements 320 extend from the carrier 310, such as forward of the carrier 310. The carrier 310 is provided at a rear of the flexible circuit support 300. The carrier 310 holds the support elements 320 relative to each other. In an exemplary embodiment, the support elements 320 are stamped and formed from a lead frame. In an exemplary embodiment, the support elements 320 include spring fingers 322 that are movable independent from each other. For example, the spring fingers 322 may be cantilevered from the carrier 310. In an exemplary embodiment, the spring fingers 322 extend parallel to each other and are spaced apart from each other by gaps. The spring fingers 322 may be oriented parallel to the loading direction for loading the pluggable module 50 into the slot 160. Each support elements 320 extends to a distal end 324. Optionally, the front portions of the support elements 320 may be curved to interface with the flexible circuit 200.

In an exemplary embodiment, the receptacle connector 100 includes a pair of the flexible circuits 200, such as an upper flexible circuit and a lower flexible circuit. In an exemplary embodiment, the flexible circuits 200 may be rear loaded into the rear cavity 126. The flexible circuits 200 may be coupled to the receptacle housing 110 and/or the housing insert 150.

The flexible circuit 200 is a flexible electronic that may be conformed or flexed into a desired shape during use. The flexible circuit 200 includes a flexible plastic substrate 210. The substrate 210 may be polyimide, polyether ether ketone (PEEK), or a polyester film. The circuit conductors 202 are formed on one or more layers of the substrate 210. For example, the circuit conductors 202 be traces, pads, vias or other circuit components printed on the layers of the substrate 210. In an exemplary embodiment, the flexible circuit 200 includes one or more ground planes to provide shielding for the signal lines of the flexible circuit 200. The flexible circuit 200 may be a flexible flat cable in alternative embodiments. The substrate 210 includes a front edge 212 and a rear edge 214. The substrate 210 includes an inner side 216 and an outer side 218. The inner side 216 is configured to interface with the pluggable module 50 and the host circuit board 10.

The flexible circuit 200 extends between a mating end 220 and a terminating end 230. The mating end 220 is configured to be mated to the pluggable module 50. The terminating end 230 is configured to be terminated to the host circuit board 10. The circuit conductors 202 extend between the mating end 220 and the terminating end 230 to electrically connect the pluggable module 50 and the host circuit board 10. In an exemplary embodiment, the flexible circuit 200 includes a transition portion 240 between the mating end 220 and the terminating end 230. In the illustrated embodiment, the transition portion 240 transitions through a right angle bend to orient the mating end 220 perpendicular to the terminating end 230. Optionally, the mating end 220 may be generally planar and the terminating end 230 may be generally planar.

In an exemplary embodiment, the flexible circuit 200 includes a stiffener 232 at the terminating end 230. The stiffener 232 is rigid. The stiffener 232 may be planar. The terminating end 230 is coupled to the stiffener 232 to hold a shape of the terminating end 230, such as for connection to the host circuit board 10. In an exemplary embodiment, the solder balls 204 are provided along the inner side 216 at the terminating end 230. The solder balls 204 electrically connect the corresponding circuit conductors 202 to pads or contacts on the host circuit board 10. In an exemplary embodiment, the flexible circuit 200 includes openings 234 at the terminating end 230. The openings 234 may pass through the stiffener 232. The openings 234 receive the connecting posts 140 to secure the flexible circuit 200 to the receptacle housing 110. The openings 234 receive the connecting posts 140 to position the terminating end 230 relative to the mounting base 130 of the receptacle housing 110 for connection to the host circuit board 10. In an exemplary embodiment, the connecting posts 140 may be heat staked to secure the terminating end 230 to the receptacle housing 110.

In an exemplary embodiment, the circuit conductors 202 include mating portions 222 on the inner side 216 of the substrate 210 at the mating end 220. The mating portions 222 are configured to be mated directly to the contacts 68 of the pluggable module 50. The circuit conductors 202 may include signal conductors and/or ground conductors and/or power conductors. The signal conductors form signal lines that allow data communication through the flexible circuit 200. The ground conductors, when used, provide shielding for the signal conductors. The ground conductors are configured to be electrically connected to the one or more ground planes, such as using vias through the substrate 210. The power conductors, when used, allow power transmission through the flexible circuit 200.

In an exemplary embodiment, the substrate 210 is flexible at the mating portions 222. In the illustrated embodiment, the mating end 220 is segmented including a plurality of mating segments 224 separated by gaps 226. The mating portions 222 are provided on respective mating segments 224. The mating segments 224 are movable independent of each other for independent mating to the corresponding contacts 68 of the pluggable module 50. The mating segments 224 are cantilevered from the main portion of the substrate 210. In an exemplary embodiment, the mating segments 224 are configured to interface with the corresponding support elements 320. For example, each support element 320 is configured to support or press against the corresponding mating segment 224 to hold the mating portion 222 in electrical contact with the corresponding contact 68 of the pluggable module 50. In alternative embodiments, rather than being segmented, the mating end 220 may be continuous but flexible to allow the mating portions 222 to interface with the contacts 68 of the pluggable module 50.

Figure 4:
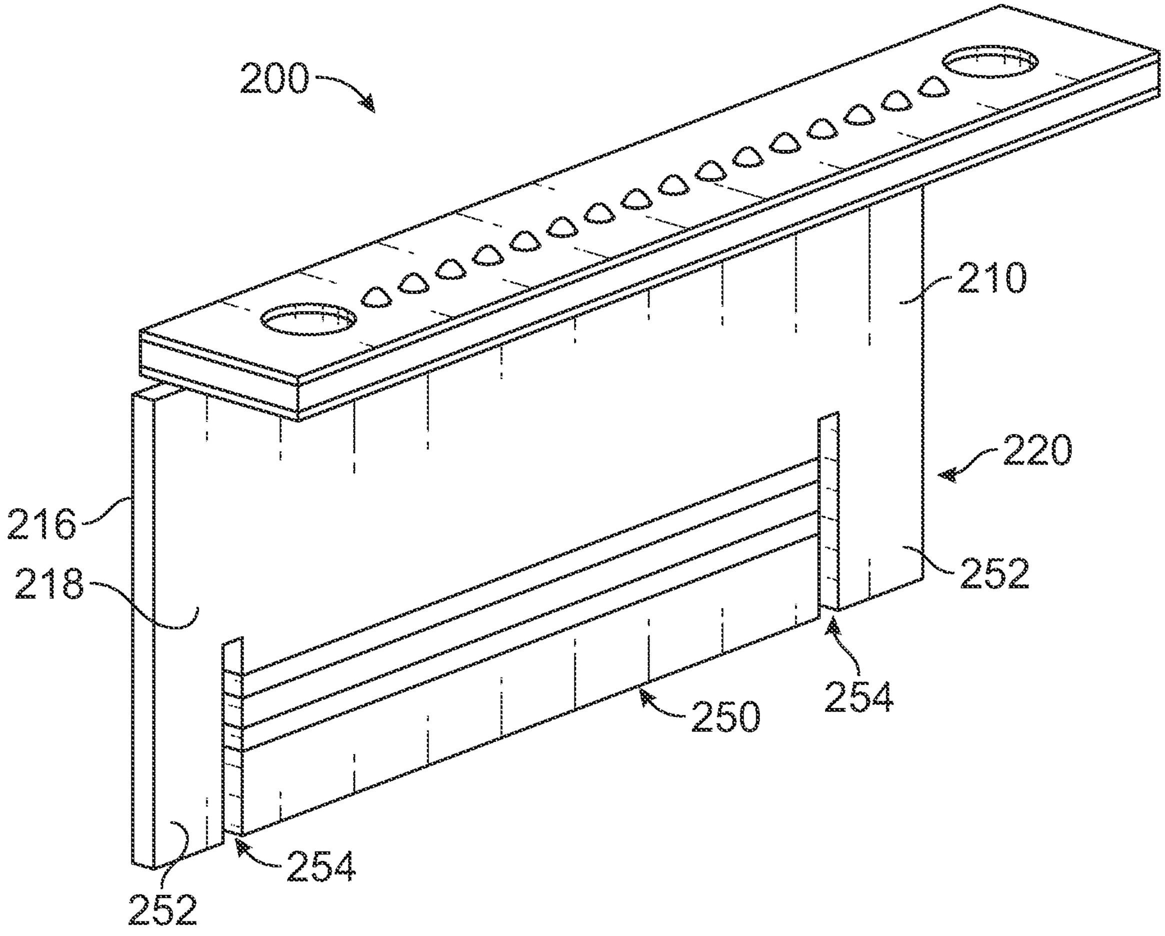
FIG. 4 is a rear perspective view of the flexible circuit in accordance with an exemplary embodiment.
Figure 5:
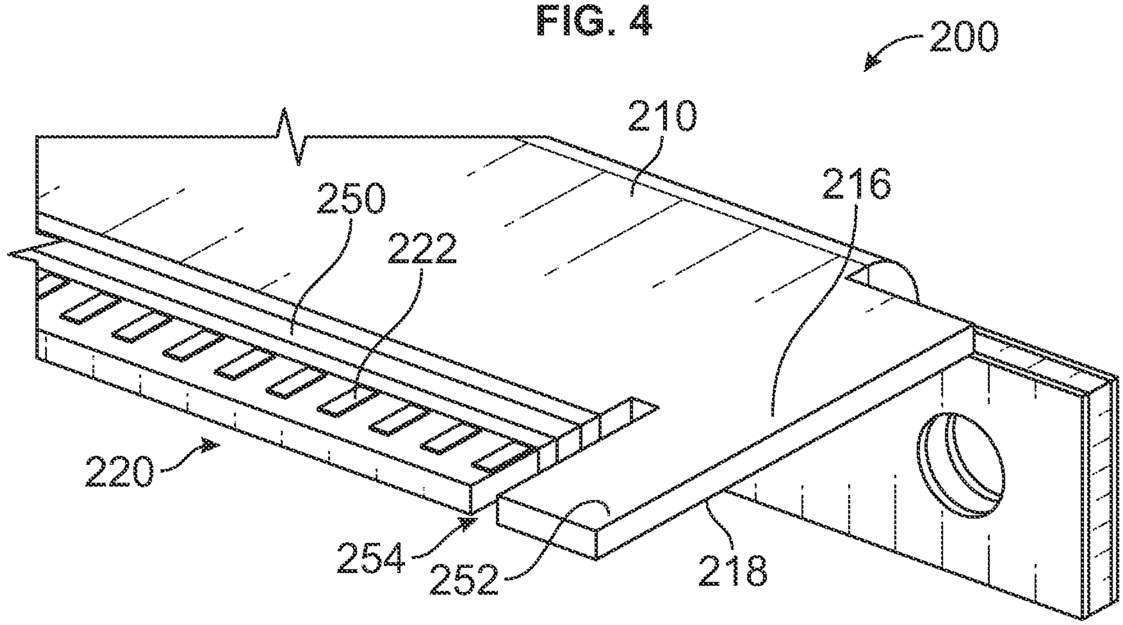
FIG. 5 is a front perspective view of the flexible circuit in accordance with an exemplary embodiment.

FIG. 4 is a rear perspective view of the flexible circuit 200 in accordance with an exemplary embodiment. FIG. 5 is a front perspective view of the flexible circuit 200 in accordance with an exemplary embodiment. In the illustrated embodiment, the mating end 220 is non-segmented. Rather, the mating end 220 includes a single mating flap 250 rather than the individual mating segments 224 (FIG. 3). The mating portions 222 extend along the inner side 216 of the mating flap 250. The mating flap 250 may be separated from stabilizers 252 by slots 254 formed in the substrate 210. The stabilizers 252 may be held in the receptacle housing 110 and/or the housing insert 150 to position the mating end 220 for connection to the pluggable module 50. The mating flap 250 is movable relative to the stabilizers 252 during mating.

For example, the support elements 320 of the flexible circuit board 300 may press against the outer side 218 of the mating flap 250 to hold the mating portions 222 in electrical contact with the pluggable module 50.

In the illustrated embodiment, the mating portions 222 are formed by traces or pads on the inner side 216 of the substrate 210. The mating portions 222 may be printed circuits. The mating portions 222 are generally two-dimensional (for example, flat) The mating portions 222 may be connected to other traces on other layers of the substrate 210 such as using vias that extend through the substrate 210.

Figure 6:
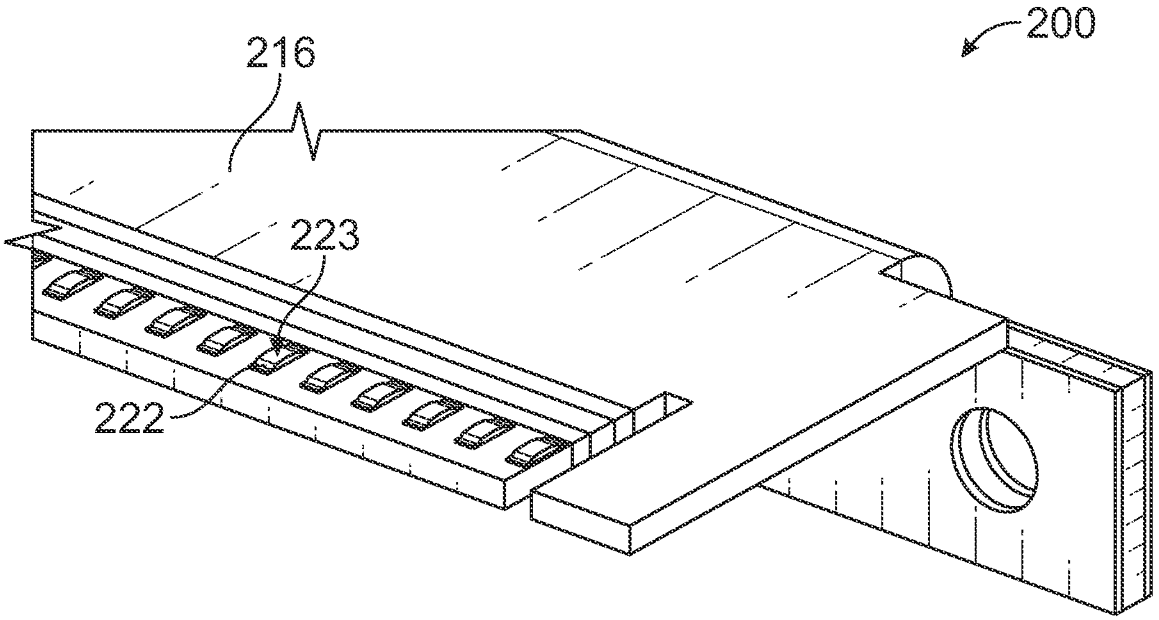
FIG. 6 is a front perspective view of the flexible circuit in accordance with an exemplary embodiment.

FIG. 6 is a front perspective view of the flexible circuit 200 in accordance with an exemplary embodiment. In the illustrated embodiment, the mating portions 222 include raised bumps 223. The raised bumps 223 may be built up by a plating process, such as button plating. The raised bumps 223 are three-dimensional (for example, curved and/or elevated off of the inner side 216).

Figure 7:
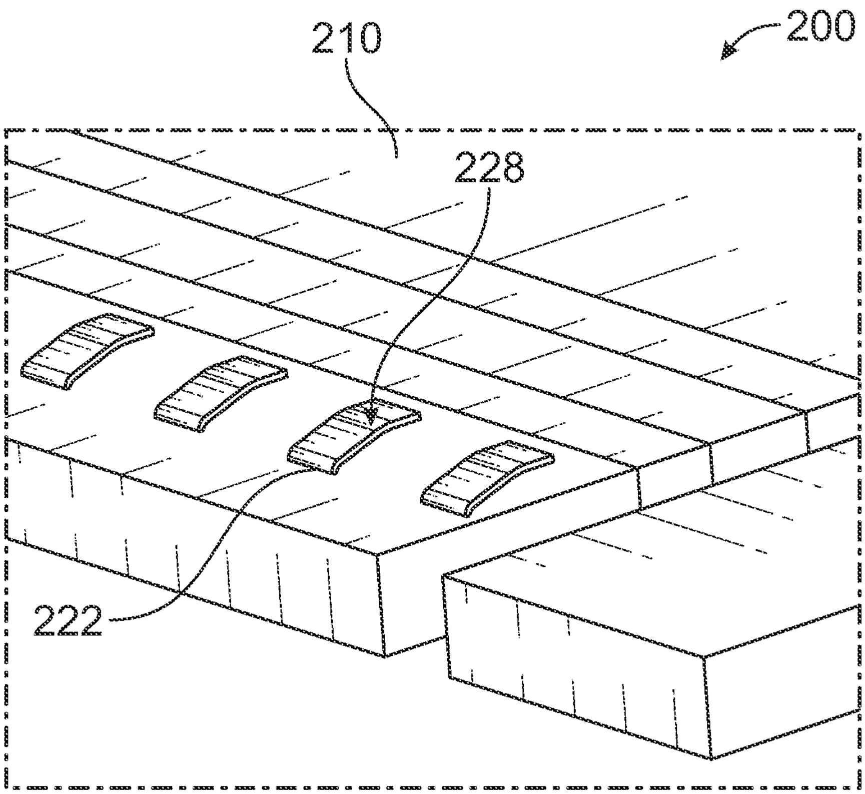
FIG. 7 is a front perspective view of the flexible circuit in accordance with an exemplary embodiment.

FIG. 7 is a front perspective view of the flexible circuit 200 in accordance with an exemplary embodiment. In the illustrated embodiment, the mating portions 222 include compliant tabs 228 coupled to the substrate 210. The compliant tabs 228 may be spring fingers. The compliant tabs 228 are deflectable relative to the substrate 210. The compliant tabs 228 may be soldered to pads or vias formed on the substrate 210.

Figure 8:
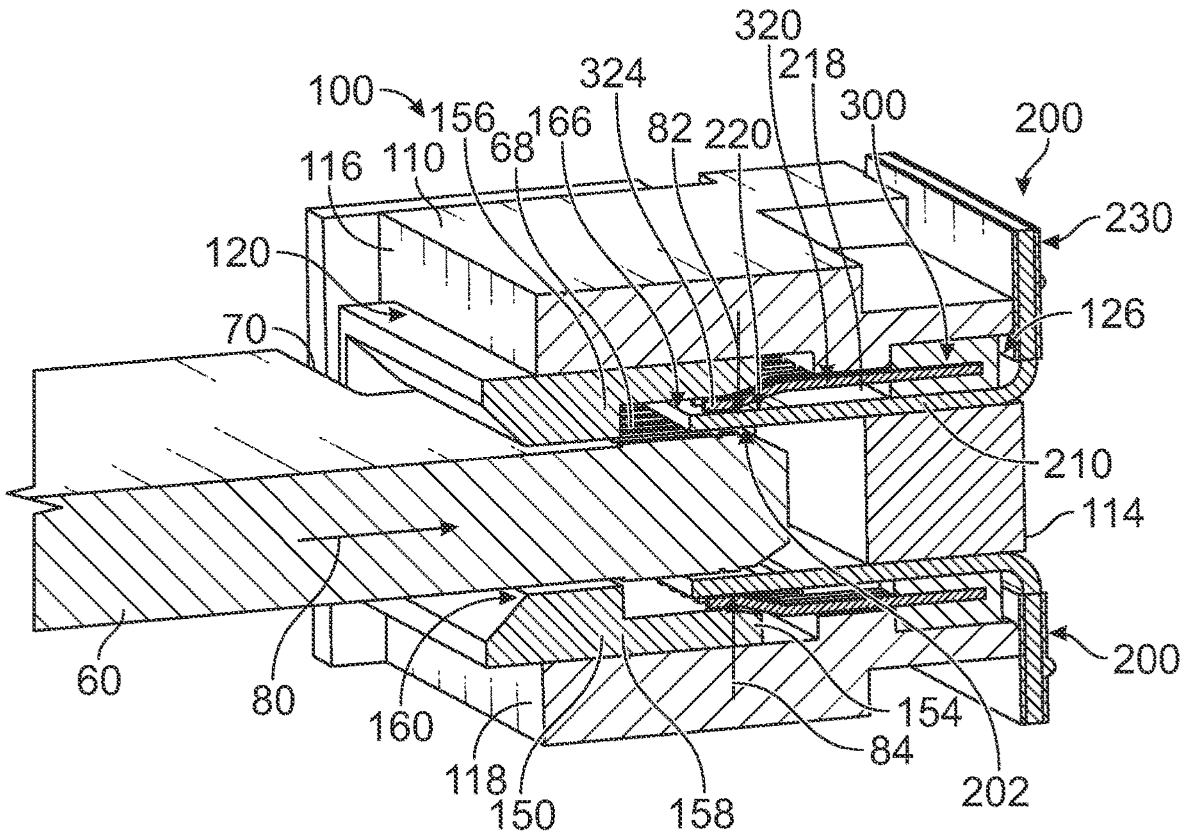
FIG. 8 is a front perspective, partial sectional view of the receptacle connector in accordance with an exemplary embodiment.
Figure 9:
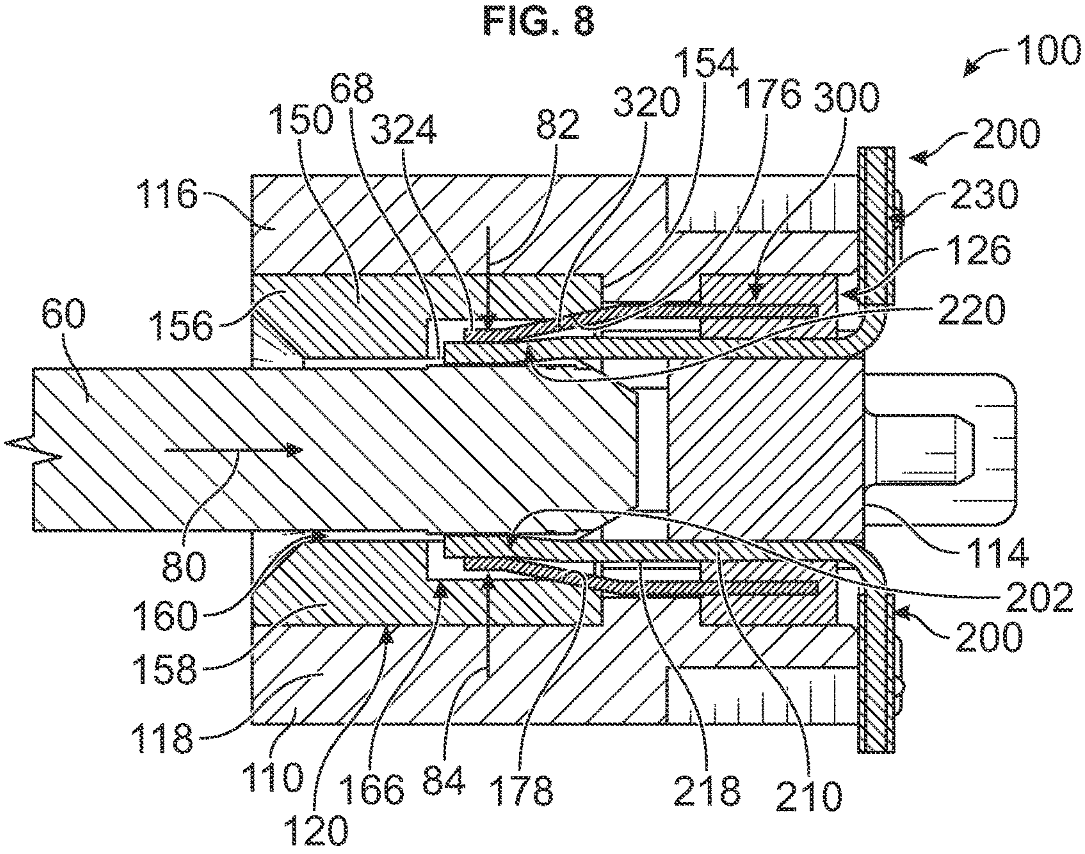
FIG. 9 is a cross-sectional view of the receptacle connector in accordance with an exemplary embodiment.

FIG. 8 is a front perspective, partial sectional view of the receptacle connector 100 in accordance with an exemplary embodiment. FIG. 9 is a cross-sectional view of the receptacle connector 100 in accordance with an exemplary embodiment. FIG. 8 illustrates the pluggable module 50 partially mated with the receptacle connector 100 whereas FIG. 9 illustrates the pluggable module 50 fully mated with the receptacle connector 100. During mating, the pluggable module 50 is plugged into the slot 160 in a loading direction 80. The flexible circuits 200 are mated to the pluggable module 50 in mating directions 82, 84. The mating directions 82, 84 may be generally perpendicular to the loading direction 80. In an exemplary embodiment, the flexible circuit supports 300 are used to press the flexible circuits 200 in the mating directions 82, 84 to make reliable electrical connections between the flexible circuits 200 and the pluggable module 50.

When assembled, the housing insert 150 is located in the front cavity 120 of the receptacle housing 110. The flexible circuit supports 300 are located in the rear cavity 126 of the receptacle housing 110. The flexible circuits 200 are located in the rear cavity 126 of the receptacle housing 110. In an exemplary embodiment, the terminating end 230 of each flexible circuit 200 extends to the exterior of the receptacle housing 110 at the rear 114 for connection to the host circuit board 10. The mating end 220 of each flexible circuit 200 is located in the rear of the housing insert 150 for connection to the pluggable module 50. For example, the mating ends 220 are located in the pockets 166. In an exemplary embodiment, the distal ends of the support elements 320 are also located in the pockets 166. The support elements 320 of the flexible circuit supports 300 interface with the corresponding flexible circuit 200 to press the circuit conductors 202 of the flexible circuit 200 into mating engagement with the contacts 68 of the pluggable module 50. For example, the support elements 320 extend along the outer side 218 of the corresponding substrate 210 to engage the substrate 210 opposite the circuit conductor 202. The support elements 320 of the upper flexible circuit support 300 are located between the mating end 220 of the upper flexible circuit 200 and the upper wall 116 of the receptacle housing 110. Similarly, the support elements 320 of the lower flexible circuit support 300 are located between the mating end 220 of the lower flexible circuit 200 and the lower wall 118 of the receptacle housing 110. In an exemplary embodiment, the distal ends 324 of the support elements 320 extend into the housing insert 150. The distal ends 324 are configured to interface with the flexible circuits 200, such as to press the flexible circuits 200 inward toward the pluggable module 50.

In an exemplary embodiment, the housing insert 150 is movable within the receptacle housing 110 between an extended position (FIG. 8) and a retracted position (FIG. 9). The housing insert 150 is moved rearwardly from the extended position to the retracted position. The biasing members 180 (FIG. 3) push the housing insert 150 in the forward biasing direction to the extended position. During mating with the pluggable module 50, the housing insert 150 is moved to the retracted position. For example, as the pluggable module 50 is plugged into the slot 160, the shoulders 70 of the circuit card 60 engage the housing insert 150 and push the housing insert 150 in the loading direction 80 (rearwardly) to the retracted position. Other components may be used to trigger or actuate the movement of the housing insert 150. For example, the pluggable housing that holds the pluggable module 50 may be used to actuate the housing insert 150. In other embodiments, the housing insert 150 may be manually actuated after the pluggable module 50 is loaded into the slot 160. In other alternative embodiments, the housing insert 150 may be stationary relative to the receptacle housing 110 during the mating process with the pluggable module 50.

In an exemplary embodiment, the housing insert 150 includes ramps 176, 178 along the upper wall 156 and the lower wall 158, respectively. The ramps 176, 178 are located at the rear 154 of the housing insert 150. The ramps 176, 178 are configured to engage the support elements 320. As the housing insert 150 is driven rearward from the extended position to the retracted position, the ramps 176, 178 force the support elements 320 to move inwardly. For example, the upper support elements 320 are moved in a downward direction to press the upper flexible circuit 200 toward the pluggable module 50 whereas the lower support elements 320 are moved in an upward direction to press the lower flexible circuit 200 toward the pluggable module 50. The flexible circuits 200 are moved relative to the receptacle housing 110 and/or the housing insert 150 during the mating process. For example, the flexible circuits 200 are moved inward toward the pluggable module 50 in the mating directions 82, 84 during mating. The support elements 320 are aligned with the circuit conductors 202 to press the circuit conductors 202 in the mating directions 82, 84 to mate the circuit conductors 202 with the corresponding contacts 68 on the pluggable module 50. The ramps and 76, 178 are configured to compress/flex the support elements 320 to tightly press the flexible circuits 200 against the pluggable module 50 to maintain electrical contact between the circuit conductors 202 and the contacts 68.

Figure 10:
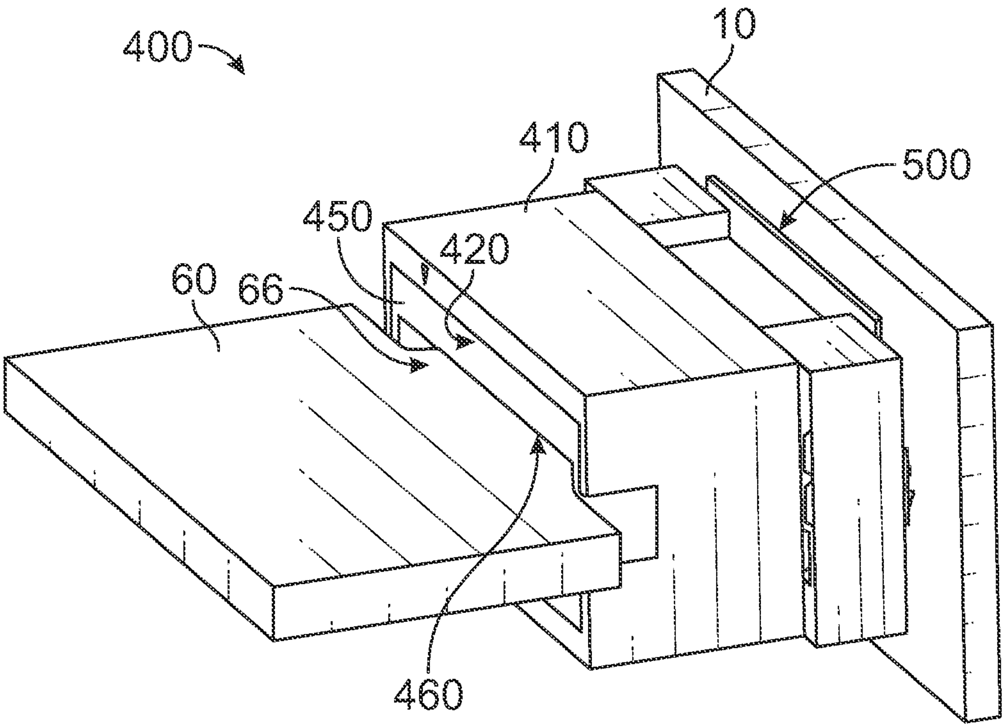
FIG. 10 is a front perspective view of a receptacle connector in accordance with an exemplary embodiment.

FIG. 10 is a front perspective view of a receptacle connector 400 in accordance with an exemplary embodiment. The receptacle connector 400 is similar to the receptacle connector 100 and may be used to electrically connect the pluggable module 50 and the host circuit board 10; however, the receptacle connector 400 does not include the movable housing insert to actuate the support elements for the flexible circuits. In an exemplary embodiment, the receptacle connector 400 is a card edge connector.

The receptacle connector 400 includes a receptacle housing 410 that receives a housing insert 450 and one or more flexible circuits 500. The housing insert 450 is received in a front cavity 420 of the receptacle housing 410. The housing insert 450 is used to position the flexible circuit 500 within the receptacle housing 410 for mating with the pluggable module 50. In an exemplary embodiment, the housing insert 450 includes a slot 460 that receives the pluggable module 50. The housing insert 450 guides the pluggable module 50 into mating engagement with the flexible circuit 500 as the card edge 66 of the pluggable module 50 is loaded into the slot 460.

Figure 11:
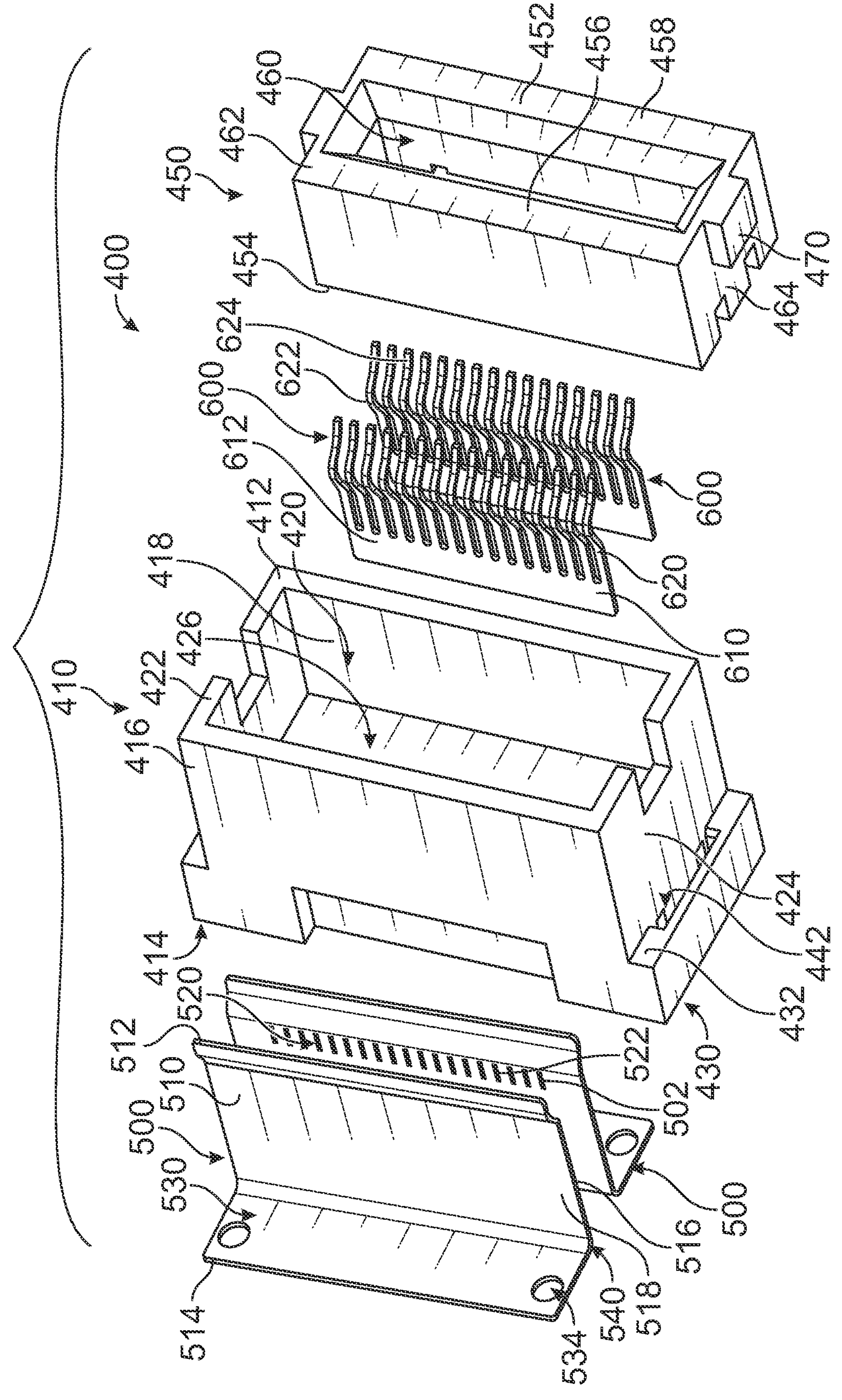
FIG. 11 is a front perspective, exploded view of the receptacle connector in accordance with an exemplary embodiment.
Figure 12:
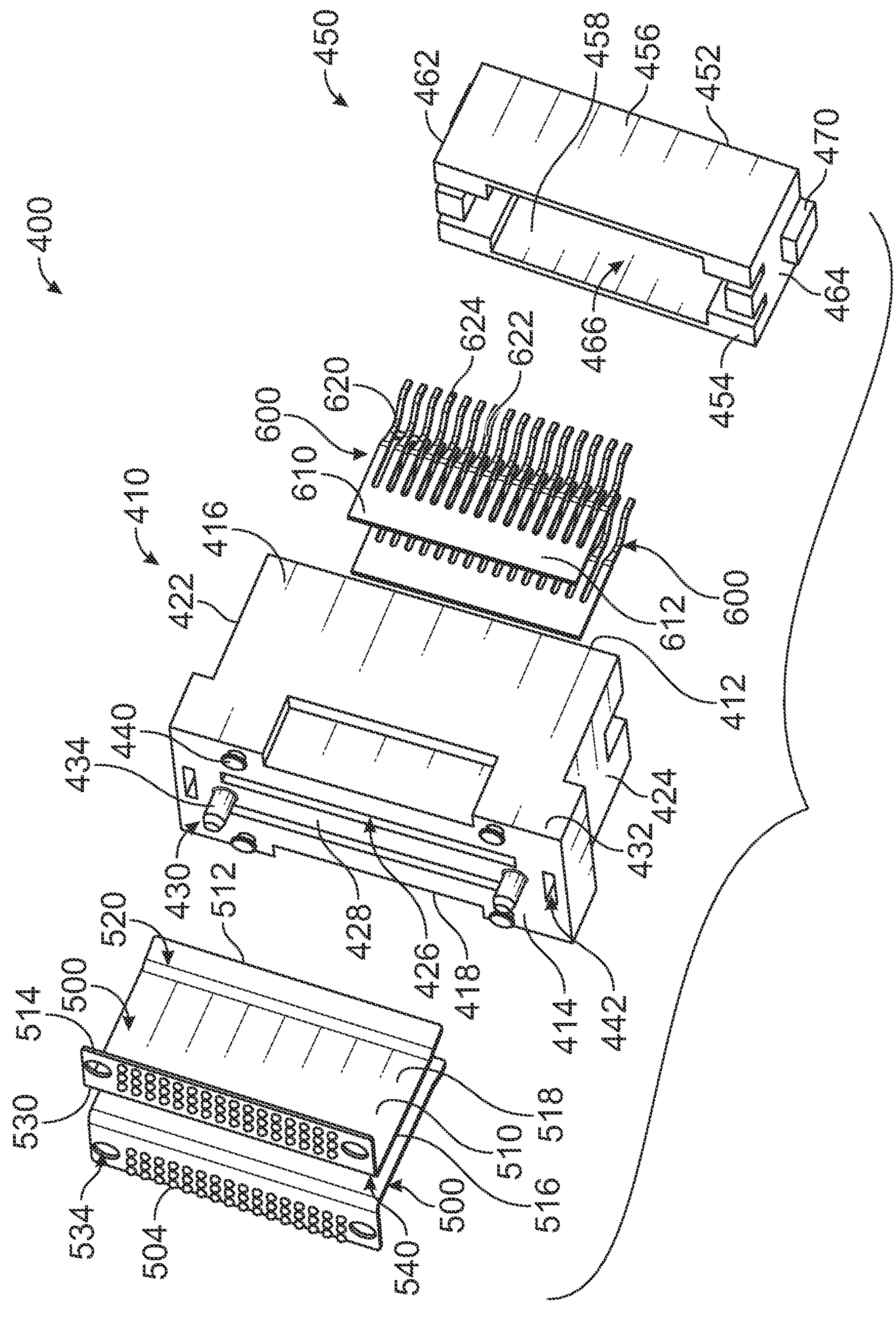
FIG. 12 is a rear perspective, exploded view of the receptacle connector in accordance with an exemplary embodiment.

FIG. 11 is a front perspective, exploded view of the receptacle connector 400 in accordance with an exemplary embodiment. FIG. 12 is a rear perspective, exploded view of the receptacle connector 400 in accordance with an exemplary embodiment. FIGS. 11 and 12 show the receptacle housing 410, the housing insert 450 and a pair of the flexible circuits 500. In an exemplary embodiment, the receptacle connector 400 includes flexible circuit supports 600 for supporting the flexible circuits 500.

The receptacle housing 410 extends between a front 412 and a rear 414. The receptacle housing 410 includes an upper wall 416 and a lower wall 418 that extend between the front 412 and the rear 414. The receptacle housing 410 includes the front cavity 420 at the front 412 between a first side wall 422 and a second side wall 424. The receptacle housing 410 includes a rear cavity 426 at the rear 414. The rear cavity 426 receives the flexible circuit supports 600 and the flexible circuits 500. In the illustrated embodiment, the receptacle housing 410 includes a base wall 428 at the rear 414 that divides the rear cavity 426 into multiple cavities, such as an upper rear cavity and a lower rear cavity that receive the corresponding upper and lower flexible circuit supports 600 and the upper and lower flexible circuits 500.

The receptacle housing 410 includes a mounting base 430 at the rear 414 configured to be mounted to the host circuit board 10. The mounting base 430 includes mounting blocks 432 at the first and second sides of the receptacle housing 410. The mounting base 430 includes locating pins 434 extending from the rear 414, such as from the base wall 428. The locating pins 434 are configured be received in openings in the host circuit board 10 to locate the receptacle connector 400 relative to the host circuit board 10, such as to locate the receptacle connector 400 relative to board contacts on the host circuit board 10. Optionally, the locating pins 434 may be keyed (for example, sized and/or shaped) for keyed connection of the receptacle connector 400 to the host circuit board 10.

In an exemplary embodiment, the receptacle housing 410 includes connecting posts 440 at the rear 414 for mechanically connecting the flexible circuits 500 to the receptacle housing 410. The connecting posts 440 are used to locate the flexible circuits 500 relative to the receptacle housing 410 (for example, side to side and/or top to bottom). The connecting posts 440 are used to secure the flexible circuits 500 to the receptacle housing 410. For example, the connecting posts 440 may be heat staked to the flexible circuits 500 to secure the flexible circuits 500 relative to the receptacle housing 410. Other types of locating and/or securing features may be used in alternative embodiments to connect the flexible circuits 500 to the receptacle housing 410.

In an exemplary embodiment, the receptacle housing 410 includes openings 442 in the side walls 422, 424 that receive portions of the housing insert 450 for locating and/or securing the housing insert 450 to the receptacle housing 410. Other types of securing elements may be used in alternative embodiments, such as threaded fasteners, clips, deflectable latches, and the like.

Figure 13:
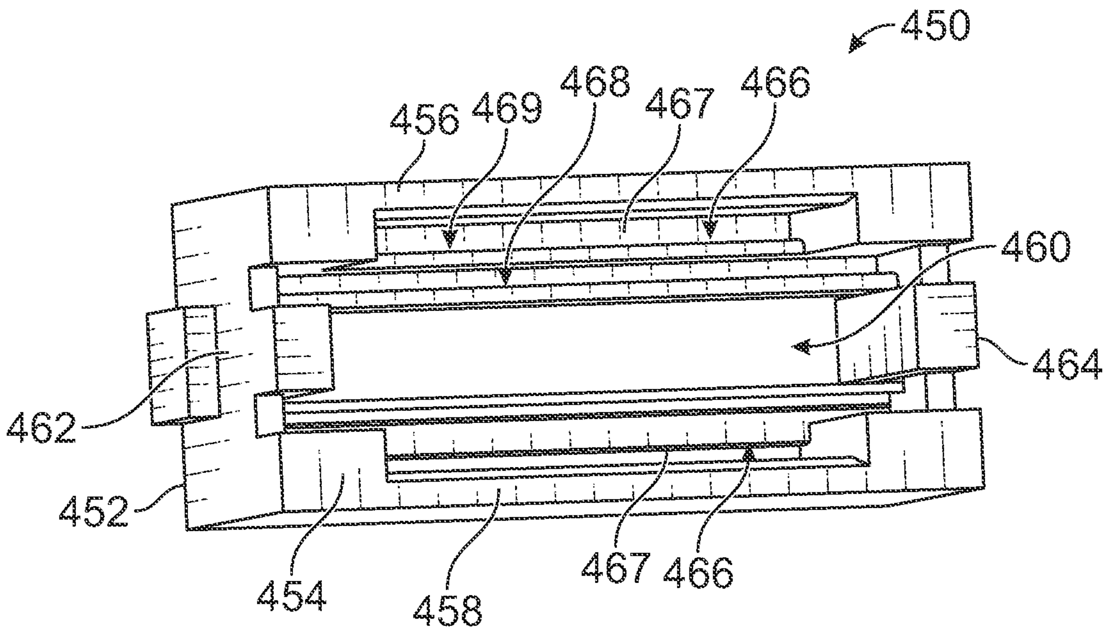
FIG. 13 is a rear perspective view of the housing insert, the housing insert extends between a front and a rear in accordance with an exemplary embodiment.

With additional reference to FIG. 13, which is a rear perspective view of the housing insert 450, the housing insert 450 extends between a front 452 and a rear 454. The housing insert 450 includes an upper wall 456 and a lower wall 458 that extend between the front 452 and the rear 454. The housing insert 450 includes the slot 460 between the upper wall 456 and the lower wall 458. The slot 460 is located between a first side wall 462 and a second side wall 464.

In an exemplary embodiment, the housing insert 450 includes pockets 466 at the rear 454, such as upper and lower pockets. The pockets 466 receive portions of the flexible circuit supports 600 and portions of the corresponding flexible circuits 500. In an exemplary embodiment, the housing insert 450 includes divider walls 467 that divide the pockets 466 into circuit pockets 468 and support element pockets 469. The circuit pockets 468 receive ends of the flexible circuits 500. The support element pockets 469 receive ends of the support elements of the flexible circuit supports 600. The circuit pockets 468 and the support element pockets 469 separate or hold the flexible circuits 500 and the flexible circuit supports 600 out of the slot 460, such as to avoid stubbing or damage during loading of the pluggable module 50 into the slot 460.

In an exemplary embodiment, the housing insert 450 includes mounting tabs 470 at the first side wall 462 and the second side wall 464. The mounting tabs 470 are used to mount the housing insert 450 to the receptacle housing 410. In an exemplary embodiment, the mounting tabs 470 are received in the openings 442 to position the housing insert 450 relative to the receptacle housing 410.

With reference back to FIGS. 11 and 12, in an exemplary embodiment, the receptacle connector 400 includes a pair of the flexible circuit supports 600, such as an upper flexible circuit support and a lower flexible circuit support. Each flexible circuit support 600 is received in the rear cavity 426 and is used to support the corresponding flexible circuit 500 in the receptacle housing 410. In an exemplary embodiment, the rear cavity 426 includes slots that receive the flexible circuit support 600. In the illustrated embodiment, the flexible circuit support 600 is configured to be front loaded into the receptacle housing 110. However, in alternative embodiments, the flexible circuit supports 600 may be rear loaded into the receptacle housing 410. In an exemplary embodiment, the flexible circuit support 600 is a lead frame. The flexible circuit support 600 may be an overmolded lead frame in other embodiments. Other types of support structures may be used in alternative embodiments.

In an exemplary embodiment, the flexible circuit support 600 includes a carrier 610 and a plurality of support elements 620. The support elements 620 extend from the carrier 610, such as forward of the carrier 610. The carrier 610 is provided at a rear of the flexible circuit support 600. The carrier 610 holds the support elements 620 relative to each other. In an exemplary embodiment, the carrier 610 includes a connecting bar 612 connecting each of the support elements 620. The connecting bar 612 and the support elements 620 may be stamped and formed from a lead frame. In an exemplary embodiment, the support elements 620 include spring fingers 622 that are movable independent from each other. For example, the spring fingers 622 may be cantilevered from the connecting bar 612 of the carrier 610. In an exemplary embodiment, the spring fingers 622 extend parallel to each other and are spaced apart from each other by gaps. The spring fingers 622 may be oriented parallel to the loading direction for loading the pluggable module 50 into the slot 460. Each support elements 620 extends to a distal end 624. Optionally, the front portions of the support elements 620 may be curved to interface with the flexible circuit 500.

In an exemplary embodiment, the receptacle connector 400 includes a pair of the flexible circuits 500, such as an upper flexible circuit and a lower flexible circuit. In an exemplary embodiment, the flexible circuits 500 may be rear loaded into the rear cavity 426. The flexible circuits 500 may be coupled to the receptacle housing 410 and/or the housing insert 450.

The flexible circuit 500 includes a substrate 510. The circuit conductors 502 are formed on one or more layers of the substrate 510. For example, the circuit conductors 502 be traces, pads, vias or other circuit components printed on the layers of the substrate 510. The substrate 510 includes a front edge 512 and a rear edge 514. The substrate 510 includes an inner side 516 and an outer side 518. The inner side 516 is configured to interface with the pluggable module 50 and the host circuit board 10.

The flexible circuit 500 extends between a mating end 520 and a terminating end 530. The mating end 520 is configured to be mated to the pluggable module 50. The terminating end 530 is configured to be terminated to the host circuit board 10. The circuit conductors 502 extend between the mating end 520 and the terminating end 530 to electrically connect the pluggable module 50 and the host circuit board 10. In an exemplary embodiment, the flexible circuit 500 includes a transition portion 540 between the mating end 520 and the terminating end 530. In the illustrated embodiment, the transition portion 540 transitions through a right angle bend to orient the mating end 520 perpendicular to the terminating end 530. Optionally, the mating end 520 may be generally planar and the terminating end 530 may be generally planar.

In an exemplary embodiment, the flexible circuit 500 includes a stiffener 532 at the terminating end 530 to hold a shape of the terminating end 530 for connection to the host circuit board 10. In an exemplary embodiment, solder balls 504 are provided along the inner side 516 at the terminating end 530 to electrically connect to the host circuit board 10. In an exemplary embodiment, the flexible circuit 500 includes openings 534 at the terminating end 530 to receive the connecting posts 440. In an exemplary embodiment, the connecting posts 440 may be heat staked to secure the terminating end 530 to the receptacle housing 410.

In an exemplary embodiment, the circuit conductors 502 include mating portions 522 on the inner side 516 of the substrate 510 at the mating end 520. The mating portions 522 are configured to be mated directly to the contacts 68 of the pluggable module 50. In an exemplary embodiment, the substrate 510 is flexible at the mating portions 522. Optionally, the mating end 520 may be segmented.

Figure 14:
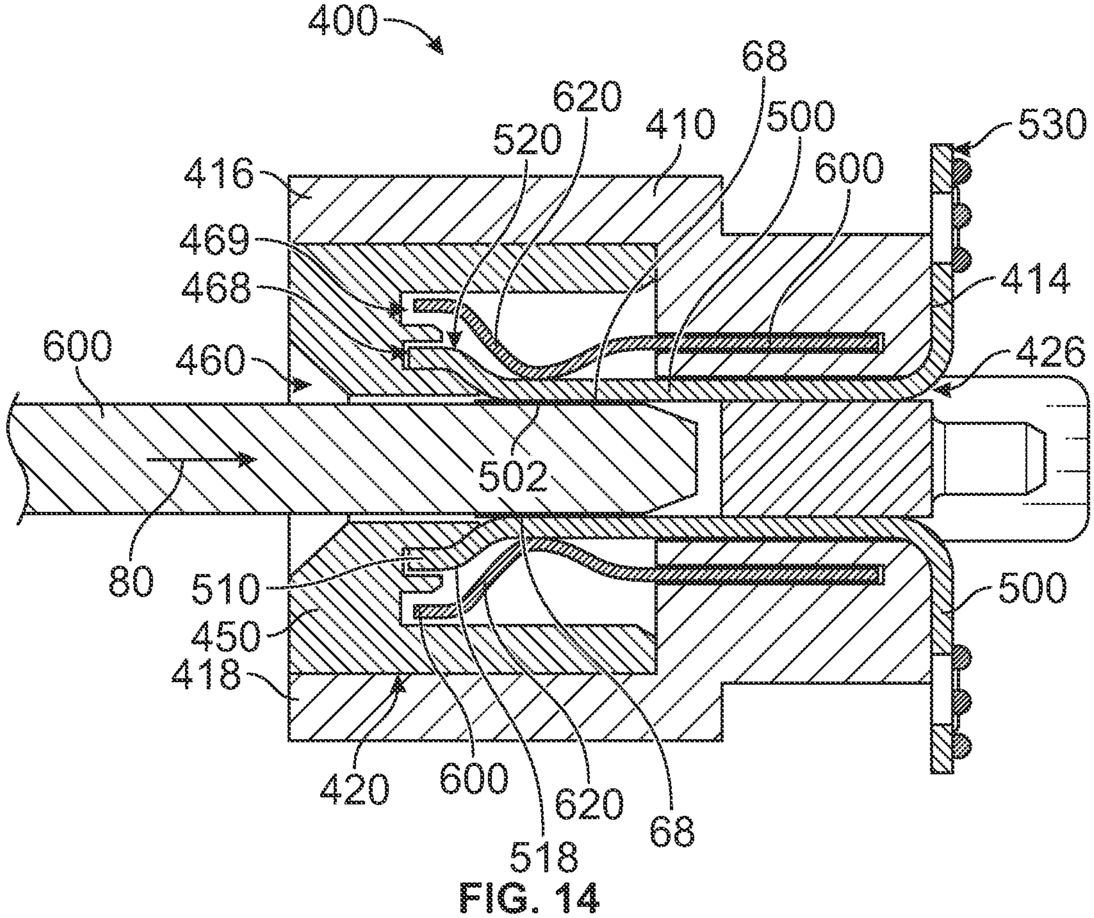
FIG. 14 is a cross-sectional view of the receptacle connector in accordance with an exemplary embodiment showing the pluggable module mated with the receptacle connector.

FIG. 14 is a cross-sectional view of the receptacle connector 400 in accordance with an exemplary embodiment showing the pluggable module 50 mated with the receptacle connector 400. During mating, the pluggable module 50 is plugged into the slot 460 in a loading direction 80. The support elements 620 press the flexible circuits 500 inward toward the pluggable module 50 to make reliable electrical connections between the flexible circuits 500 and the pluggable module 50.

When assembled, the housing insert 450 is located in the front cavity 420 of the receptacle housing 410. The flexible circuit supports 600 are located in the rear cavity 426 of the receptacle housing 410. The flexible circuits 500 are located in the rear cavity 426 of the receptacle housing 410. In an exemplary embodiment, the terminating end 530 of each flexible circuit 500 extends to the exterior of the receptacle housing 410 at the rear 414 for connection to the host circuit board 10. The mating end 520 of each flexible circuit 500 is located in the rear of the housing insert 450 for connection to the pluggable module 50. For example, the mating ends 520 are located in the circuit pockets 468. In an exemplary embodiment, the distal ends of the support elements 620 are also located in the housing insert 450, such as in support element pockets 469. The circuit pockets 468 and the support element pockets 469 separate or hold the flexible circuits 500 and the flexible circuit supports 600 out of the slot 460, such as to avoid stubbing or damage during loading of the pluggable module 50 into the slot 460.

The support elements 620 of the flexible circuit supports 600 interface with the corresponding flexible circuit 500 to press the circuit conductors 502 of the flexible circuit 500 into mating engagement with the contacts 68 of the pluggable module 50. For example, the support elements 620 extend along the outer side 518 of the corresponding substrate 510 to engage the substrate 510 opposite the circuit conductor 502. The support elements 620 of the upper flexible circuit support 600 are located between the mating end 520 of the upper flexible circuit 500 and the upper wall 416 of the receptacle housing 410. Similarly, the support elements 620 of the lower flexible circuit support 600 are located between the mating end 520 of the lower flexible circuit 500 and the lower wall 418 of the receptacle housing 410. In an exemplary embodiment, the support elements 620 are movable in the support element pockets 469. For example, when the pluggable module 50 is plugged into the slot 460, the flexible circuits 500 and the flexible circuit supports 600 are shifted outward. The outward flexing of the support elements 620 creates internal biasing forces in an inward direction to press the support elements 620 inward against the flexible circuits 500. The support elements 620 are aligned with the circuit conductors 502 to press the circuit conductors 502 in an inward mating direction to mate the circuit conductors 502 with the corresponding contacts 68 on the pluggable module 50. The support elements 620 tightly press the flexible circuits 500 against the pluggable module 50 to maintain electrical contact between the circuit conductors 502 and the contacts 68.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector comprising:

a receptacle housing having a front cavity and a rear cavity, the receptacle housing having a mounting base at the rear configured to be mounted to a host circuit board;

a housing insert received in the front cavity, the housing insert including a slot configured to receive a mating end of a pluggable module;

a flexible circuit received in the rear cavity, the flexible circuit having a mating end received in the housing insert and extending along the slot for mating engagement with the pluggable module, the flexible circuit including circuit conductors at the mating end for mating engagement with contacts at the mating end of the pluggable module, the flexible circuit including a terminating end extending from the receptacle housing for termination to the host circuit board; and a flexible circuit support to support the flexible circuit in the receptacle housing, the flexible circuit support including a carrier received in the rear cavity and support elements extending from the carrier into the housing insert, the support elements engaging the flexible circuit to press the circuit conductors into mating engagement with the contacts of the pluggable module.

2. The receptacle connector of claim 1, wherein the housing insert includes a mounting tab coupled to the receptacle housing.

3. The receptacle connector of claim 1, wherein the housing insert is removable from the front cavity of the receptacle housing.

4. The receptacle connector of claim 1, wherein the support elements are independently movable relative to each other to engage the flexible circuit.

5. The receptacle connector of claim 1, wherein the carrier includes a connecting bar connecting each of the support elements to each other at the carrier.

6. The receptacle connector of claim 1, wherein the flexible circuit includes a stiffener at the terminating end, the stiffener rigidly holding the flexible circuit at the terminating end relative to the housing.

7. The receptacle connector of claim 1, wherein the terminating end is coupled to the mounting base for connection to the host circuit board.

8. The receptacle connector of claim 1, wherein the flexible circuit includes a ball grid array of solder balls at the terminating end configured to be soldered to the host circuit board.

9. The receptacle connector of claim 1, wherein the support elements are movable within the receptacle housing during loading of the pluggable module into the slot.

10. The receptacle connector of claim 1, wherein the support elements include spring fingers, the spring fingers being spring biased against the flexible circuit to press the circuit conductors into mating engagement with the contacts of the pluggable module.

11. The receptacle connector of claim 1, wherein the slot is configured to receive the pluggable module in a loading direction, the support elements extending parallel to the loading direction.

12. The receptacle connector of claim 1, wherein the housing insert including a flexible circuit pocket outward of the slot and a support element pocket outward of the flexible circuit pocket, the mating end of the flexible circuit received in the flexible circuit pocket, the support elements extending from the carrier into the support element pocket.

13. The receptacle connector of claim 1, further comprising a biasing member coupled between the receptacle housing and the housing insert, wherein the housing insert is movable within the front cavity between an extended position and a retracted position, the biasing member forward biasing the housing insert relative to the receptacle housing in the extended position, the biasing member being compressed when the housing insert is moved from the extended position to the retracted position, wherein the housing insert moves the support elements inward toward the flexible circuit as the housing insert is moved from the extended position to the retracted position to press the circuit conductors into mating engagement with the contacts of the pluggable module.

14. The receptacle connector of claim 1, wherein the circuit conductors include raised bumps extending from the flexible circuit to mate with the contacts of the pluggable module.

15. The receptacle connector of claim 1, wherein the circuit conductors include compliant tabs extending from the flexible circuit to mate with the contacts of the pluggable module.

16. A receptacle connector comprising:

a receptacle housing having a front cavity and a rear cavity, the receptacle housing having a mounting base at the rear configured to be mounted to a host circuit board;

a housing insert received in the front cavity, the housing insert including a slot configured to receive a mating end of a pluggable module;

a biasing member coupled between the receptacle housing and the housing insert, wherein the housing insert is movable within the front cavity between an extended position and a retracted position, the biasing member forward biasing the housing insert relative to the receptacle housing in the extended position, the biasing member being compressed when the housing insert is moved from the extended position to the retracted position;

a flexible circuit received in the rear cavity, the flexible circuit having a mating end received in the housing insert and extending along the slot for mating engagement with the pluggable module, the flexible circuit including circuit conductors at the mating end for mating engagement with contacts at the mating end of the pluggable module, the flexible circuit including a terminating end extending from the receptacle housing for termination to the host circuit board; and a flexible circuit support to support the flexible circuit in the receptacle housing, the flexible circuit support including a carrier received in the rear cavity and support elements extending from the carrier into the housing insert;

wherein the housing insert moves the support elements inward toward the flexible circuit as the housing insert is moved from the extended position to the retracted position to press the circuit conductors into mating engagement with the contacts of the pluggable module.

17. The receptacle connector of claim 16, wherein the slot is configured to receive the pluggable module in a loading direction, the support elements extending parallel to the loading direction, the housing insert being movable parallel to the loading direction, the housing insert pressing against the support elements to move the support elements perpendicular to the loading direction.

18. A receptacle connector comprising:

a receptacle housing having a front cavity and a rear cavity, the receptacle housing having a mounting base at the rear configured to be mounted to a host circuit board;

a housing insert received in the front cavity, the housing insert including a slot configured to receive a mating end of a pluggable module, the housing insert including a flexible circuit pocket outward of the slot and a support element pocket outward of the flexible circuit pocket;

a flexible circuit received in the rear cavity, the flexible circuit having a mating end received in the flexible circuit pocket of the housing insert, the flexible circuit including circuit conductors at the mating end for mating engagement with contacts at the mating end of the pluggable module, the flexible circuit including a terminating end extending from the receptacle housing for termination to the host circuit board; and a flexible circuit support to support the flexible circuit in the receptacle housing, the flexible circuit support including a carrier received in the rear cavity and support elements extending from the carrier into the support element pocket of the housing insert, the support elements engaging the flexible circuit to press the circuit conductors into mating engagement with the contacts of the pluggable module.

19. The receptacle connector of claim 18, wherein the support elements are movable within the support element pockets.

20. The receptacle connector of claim 18, wherein the support elements are independently movable relative to each other to engage the flexible circuit.

* * * * *